US012416946B2

(12) United States Patent
Lee et al.

(10) Patent No.: US 12,416,946 B2
(45) Date of Patent: Sep. 16, 2025

(54) DISPLAY APPARATUS

(71) Applicant: SAMSUNG DISPLAY CO., LTD., Yongin-si (KR)

(72) Inventors: Jeoungsub Lee, Yongin-si (KR); Sangjae Kim, Yongin-si (KR); Juhee Song, Yongin-si (KR); Donghee Lee, Yongin-si (KR); Joonggun Chong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 656 days.

(21) Appl. No.: 17/834,388

(22) Filed: Jun. 7, 2022

(65) Prior Publication Data

US 2023/0060488 A1   Mar. 2, 2023

(30) Foreign Application Priority Data

Aug. 26, 2021   (KR) .................. 10-2021-0113397

(51) Int. Cl.
*G06F 1/16*   (2006.01)
(52) U.S. Cl.
CPC .......... *G06F 1/1656* (2013.01); *G06F 1/1616* (2013.01)
(58) Field of Classification Search
CPC ............... G06F 1/1626; G06F 1/1652
See application file for complete search history.

(56) References Cited

U.S. PATENT DOCUMENTS

| | | | |
|---|---|---|---|
| 10,303,218 B2 | 5/2019 | Jones et al. | |
| 11,457,536 B2 | 9/2022 | Shin et al. | |
| 11,577,492 B2 * | 2/2023 | Woody, V | ................ B32B 7/02 |
| 12,216,089 B2 * | 2/2025 | Chafin | ................... G01N 29/07 |
| 2019/0143638 A1 | 5/2019 | Park et al. | |
| 2020/0355852 A1 | 11/2020 | Lee et al. | |
| 2021/0036259 A1 | 2/2021 | Song et al. | |
| 2021/0120691 A1 * | 4/2021 | Su | ..................... G02F 1/133331 |
| 2022/0213350 A1 * | 7/2022 | Nishio | ..................... G02B 1/14 |
| 2022/0236457 A1 * | 7/2022 | Hwang | ................ G02B 5/3083 |
| 2022/0276411 A1 | 9/2022 | Heo et al. | |
| 2023/0101087 A1 * | 3/2023 | Li | ......................... G06F 1/1643 |
| | | | 257/40 |

FOREIGN PATENT DOCUMENTS

| | | |
|---|---|---|
| KR | 10-2017-0107141 A | 9/2017 |
| KR | 10-2019-0056474 | 5/2019 |
| KR | 10-2020-0059370 A | 5/2020 |
| KR | 10-2020-0130565 | 11/2020 |
| KR | 10-2021-0016124 | 2/2021 |
| KR | 10-2021-0028961 A | 3/2021 |

* cited by examiner

*Primary Examiner* — Anthony Q Edwards
(74) *Attorney, Agent, or Firm* — F. CHAU & ASSOCIATES, LLC

(57) ABSTRACT

A display apparatus includes a display panel. A cover window covers the display panel. A first film is arranged over the cover window. The first film has a first rate of change of a storage modulus at frequencies due to external impacts that are below a reference frequency and a second rate of change of the storage modulus at frequencies due to external impacts that are above the reference frequency.

22 Claims, 10 Drawing Sheets

DISPLAY APPARATUS

CROSS-REFERENCE TO RELATED APPLICATION

This application claims priority under 35 U.S.C. § 1.19 to Korean Patent Application No. 10-2021-0113397, filed on Aug. 26, 2021 in the Korean Intellectual Property Office, the disclosure of which is incorporated by reference in its entirety herein.

1. TECHNICAL FIELD

One or more embodiments relate to a display apparatus that may prevent or reduce damage to a display panel due to external impacts.

2. DISCUSSION OF RELATED ART

Electronic apparatuses have experienced widespread use in a variety of different fields. Electronic apparatuses are variously used in mobile electronic apparatuses and fixed-type electronic apparatuses. To support various functions, electronic apparatuses may include a display apparatus to provide a user with visual information such as images.

Recently, as parts for driving a display apparatus have been miniaturized, the portion of an electronic apparatus comprised of the display apparatus has gradually increased. Display apparatuses that are bendable or foldable are in development. Such display apparatuses include various members such as a flexible display panel or a flexible window. The various members may each be attached to the upper portion or the lower portion of a display panel and bent folded together with the display panel.

The various members of the display apparatus may be flexible to permit the display apparatus to be bent or folded. However, in an embodiment in which the various members are flexible, the reliability of the members against external impacts may be reduced.

SUMMARY

One or more embodiments include a display apparatus that may prevent or reduce damage to a display panel due to impacts.

However, such a technical problem is an example, and embodiments of the present disclosure are not limited thereto.

Additional aspects will be set forth in part in the description which follows and, in part, will be apparent from the description, or may be learned by practice of the presented embodiments of the disclosure.

According to an embodiment of the present disclosure, a display apparatus includes a display panel. A cover window covers the display panel. A first film is arranged over the cover window. The first film has a first rate of change of a storage modulus at frequencies due to external impacts that are below a reference frequency and a second rate of change of the storage modulus at frequencies due to external impacts that are above the reference frequency.

In an embodiment, the first rate of change may be different from the second rate of change.

In an embodiment, the reference frequency may be about 1 Hz.

In embodiment, the first rate of change may be less than the second rate of change.

In an embodiment a tensile modulus of the first film may be in a range of about 4 GPa to about 11 GPa at 25° C.

In an embodiment, the first film may be arranged on a first side of the cover window, and the display panel may be arranged on a second side of the cover window that is opposite to the first side of the cover window.

In an embodiment, a light transmittance of the first film may be at least about 90%.

In an embodiment, the display panel may include a first folding axis and a second folding axis arranged in a first direction, the first folding axis extends parallel to the second folding axis; and the display panel is configured to be in-folded around the first folding axis and the second folding axis.

In an embodiment, the display apparatus may further include a second film arrange between the display panel and the cover window. The second film is configured to absorb impacts.

In an embodiment, at least one of the first film and the second film may be coated on the cover window.

In an embodiment, the second film may include an elastomer.

In an embodiment, a thickness of the second film is in a range of about 50 μm to about 75 μm.

In an embodiment, an elastic modulus of the second film at 85° C. may be in a range of about 100 MPa to about. 600 MPa.

In an embodiment, an elastic modulus of the second film at 25° C. may be in a range of about 600 MN to about 1000 MPa.

In an embodiment, an elastic modulus of the second film at −20° C. may be in a range of about 1000 MPa to about 1500 MPa.

In an embodiment, the second film may include a plurality of layers, and an elastic modulus of a first layer that is immediately adjacent to the cover window has a largest elastic modulus among, the plurality of layers.

In an embodiment, the second film may include a first layer adjacent to the cover window and a second layer adjacent to the display panel. A thickness of the first layer may be less than a thickness of the second layer.

In an embodiment, the display panel ma include a first folding axis and a second folding axis arranged in a first direction. The first folding axis extends parallel to the second folding axis. The display panel is configured to be in-folded around the first folding axis and the second folding axis.

According to an embodiment of the present disclosure, a display apparatus includes a display panel. A cover window covers the display panel. A second film is arranged between the display panel and the cover window. The second film is configured to absorb impacts. The display panel, the cover window, and the second film are configured to be in-folded around a first folding axis and a second folding axis arranged in a first direction. The first folding axis extends parallel to the second folding axis.

In an embodiment, an elastic modulus of the second film at 85° C. may be in a range of about 100 MPa to about 600 MPa.

In an embodiment, an elastic modulus of the second film at 25° C. may be in a range of about 600 MPa to about 1000 MN.

In an embodiment, an elastic modulus of the second film at −20° C. may be in a range of about 1000 MPa to about 1500 MPa.

In an embodiment, the second film may include a plurality of layers, and an elastic modulus of a first, layer that is immediately adjacent to the cover window has a largest elastic modulus among, the plurality of layers.

These and/or other aspects will become apparent and more readily appreciated from the following description of the embodiments, the accompanying drawings, and claims.

BRIEF DESCRIPTION OF THE DRAWINGS

The above and other aspects, features, and advantages of embodiments of the present disclosure will be more apparent from the Mowing description taken in conjunction with the accompanying drawings, in which.

DETAILED DESCRIPTION OF EMBODIMENTS

Figure 1:
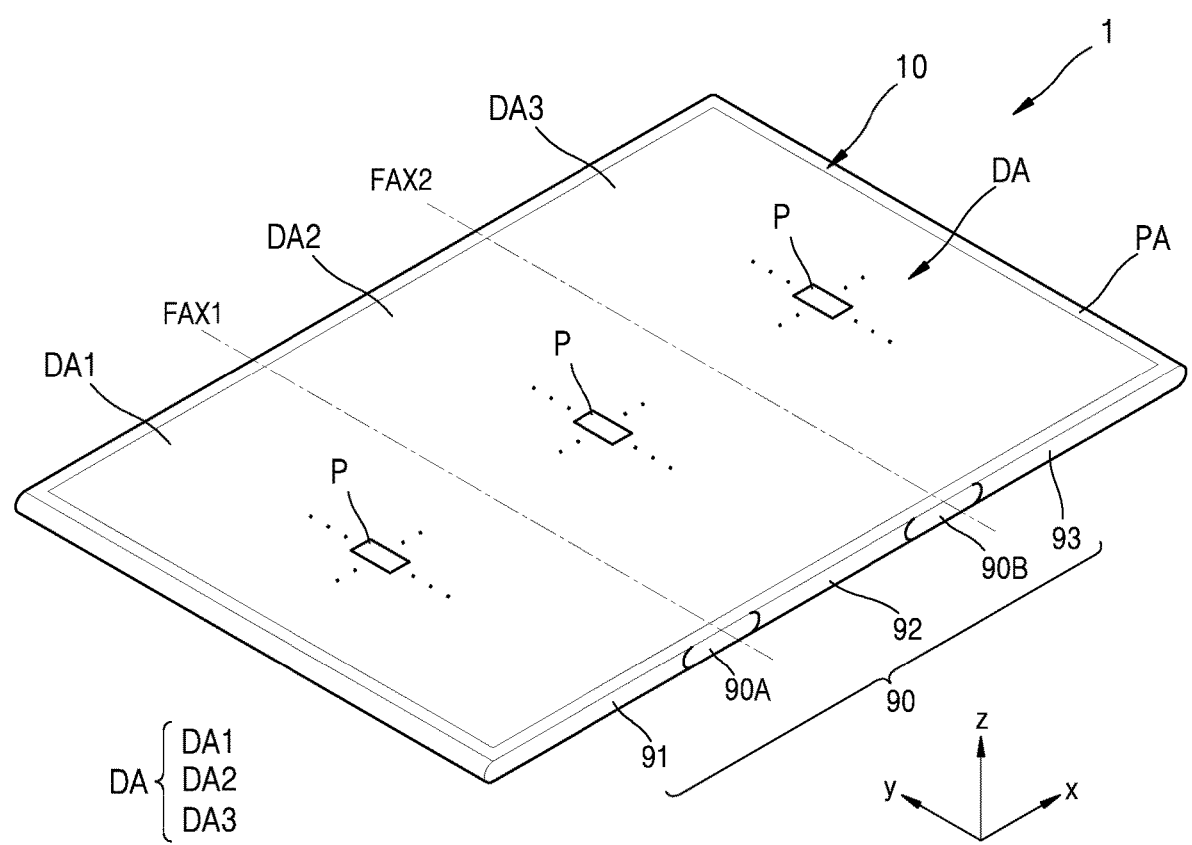
FIG. 1 is a perspective view of a display apparatus in an unfolded state according to an embodiment of the present disclosure.

Reference will now be made in detail to embodiments, examples of which are illustrated in the accompanying drawings, wherein like reference: numerals refer to like elements throughout. In this regard, the present embodiments may have different forms and should not be construed as being limited to the descriptions set forth herein. Accordingly, embodiments are merely described below, by referring to the figures, to explain aspects of the present disclosure. As used herein, the term "and/or" includes any and all combinations of one more of the associated listed items. Throughout the disclosure, the expression "at least one of a, b or c" indicates only a, only b, only c, both a and b, both a and c, both b and c, all of a, b, and c or variations thereof.

As the present disclosure allows for various changes and numerous embodiments, certain embodiments will be illustrated in the drawings and described in the written description. Effects and features of the present disclosure, and methods for achieving them will be clarified with reference to embodiments described below in detail with reference to the drawings. However, the present disclosure is not limited to the following embodiments and may be embodied in various forms.

Hereinafter, embodiments of the present disclosure are described in detail with reference to the accompanying drawings. When description is made with reference to the drawings, like reference numerals are used for like or corresponding elements and repeated descriptions thereof are omitted.

While such terms as "first" and "second" may be used to describe various components, such components must not be limited to the above terms. The above terms are used to distinguish one component from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or components but do not preclude the addition of one or more other features or components.

It will be further understood that, when a layer, region, or component is referred to as being "on" another layer, region, or component, it can be directly or indirectly on the other layer, region, or component. For example, intervening layers, regions, or components may be present. When a layer, region, or component is referred to as being "directly on" another layer, region, or component, no intervening layers, regions, or components may be present.

Sizes of elements in the drawings may be exaggerated or reduced for convenience of explanation. For example, since sizes and thicknesses of elements in the drawings may be arbitrarily illustrated for convenience of explanation, embodiments of the present disclosure are not limited thereto.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

In the case where a certain embodiment may be implemented differently, a specific process order may be performed in the order different from the described order. As an example, two processes that are successively described may be substantially simultaneously performed or performed in the order opposite to the order described.

Figure 2:
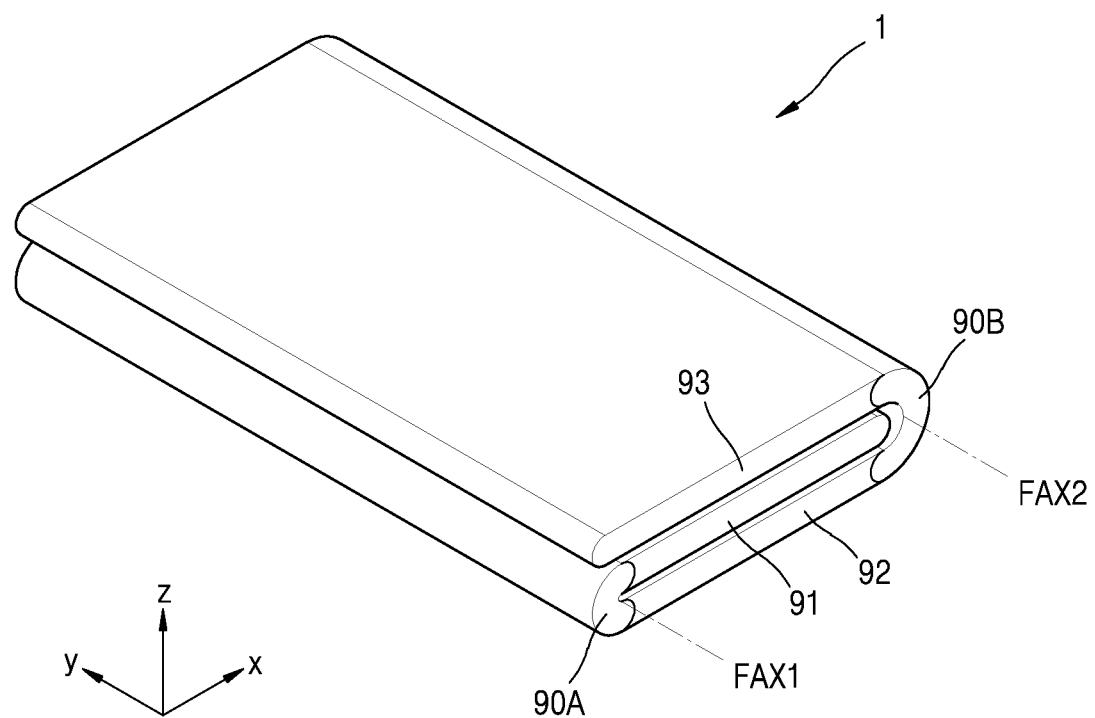
FIG. 2 is a perspective view of a display apparatus in a folded state according, to an embodiment of the present disclosure.

FIGS. 1 and 2 are perspective views of a display apparatus 1 according to an embodiment. FIG. 1 is a perspective view of the display apparatus 1 that is unfolded, and FIG. 2 is a perspective view of the display apparatus 1 that is folded.

Referring to FIGS. 1 and 2, the display apparatus 1 may include a display panel 10 and a lower cover 90. The display panel 10 may include a display area DA and a peripheral area PA surrounding the display area DA. For example, in an embodiment, the peripheral area PA may completely surround the display area DA (e.g., in the X and Y directions). However, embodiments of the present disclosure are not limited thereto and one Or more sides of the display area DA may not be surrounded by the peripheral area PA. In an embodiment, the display panel 10 may display images in the display area DA and may not display images in the peripheral area PA. Pixels P each including a display element may be arranged in the display area DA. The display apparatus 1 may display images by using light emitted from the pixels P arranged in the display area DA, and the peripheral area PA may be a non-display area in which the pixels P are not arranged.

In an embodiment as shown in FIG. 1, the display area DA may include a first display area DA1, a second display area DA2, and a third display area DA3 that are arranged in the X direction. However, embodiments of the present disclosure are not limited thereto and the number of the display areas and the arrangement thereof may vary. The pixels P may be arranged in each of the first display area DA1, the second display area DA2, and the third display area DA3. The display apparatus 1 may display images by using, the pixels P arranged in the first display area DA1, the second display area DA2, and the third display area DA3. The first display area DA1, the second display area DA2, and the third display area DA3 may be surrounded by the peripheral area PA.

Hereinafter, though an organic light-emitting display apparatus is described as an example of the display apparatus 1 according to an embodiment, the display apparatus according to an embodiment of the present disclosure is not limited thereto. For example, in an embodiment, the display apparatus 1 may be a display apparatus such as an inorganic light-emitting display or a quantum-dot light-emitting display. In an embodiment, an emission layer of a display element of the display apparatus 1 may include an organic material, an inorganic material, quantum dots, an organic material and quantum dots, or an inorganic material and quantum dots. However, embodiments of the present disclosure are not limited thereto.

In an embodiment, the display panel 10 may be a flexible display panel that has a flexible body which is easily bendable, foldable, or rollable. As an example, the display panel 10 may be a foldable display panel that is folded and unfolded, a curved display panel including a curved display surface, a bent display panel in which a region except a display surface is bent, a rollable display panel that may be rolled or unrolled, and a stretchable display panel that is stretchable. However, embodiments of the present disclosure are not limited thereto. For example, in an embodiment, the display panel 10 may be a display panel having a relatively high rigidity and thus is not easily bent.

In an embodiment, the display panel 10 may include a first folding axis FAX1 and a second folding axis FAX2 that are arranged in one direction (e.g., the X direction) and may extend parallel to each other in one direction (e.g., the Y direction). However, embodiments of the present disclosure are not limited thereto and the arrangement of the first and second folding axes FA1, FA2 may vary. The display panel 10 may be folded around the first folding axis FAX1 and the second folding axis FAX2.

The first display area DA1 and the second display area DA2 may be defined with the first folding axis FAX therebetween (e.g., in the X direction), in addition, the second display area DA2 and the third display area DA3 may be defined with the second folding, axis FAX2 therebetween (e.g., in the X direction).

The lower cover 90 may form a lower appearance of the display apparatus 1. In an embodiment, the lower cover 60 may include plastic, metal, or both plastic and metal. The lower cover 90 may include a first portion 91, a second portion 92, and a third portion 93 each supporting the display panel 10, such as a lower surface of the display panel 10, The lower cover 90 may be folded around the first folding axis FAX1 between the first portion 91 and the second portion 92. In addition, the lower cover 90 may be folded around the second folding axis FAX2 between the second portion 92 and the third portion 93.

In an embodiment, a first hinge part 90A may be disposed between the first portion 91 and the second portion 92 (e.g., in the X direction). A second hinge pan 90B may be disposed between the second portion 92 and the third portion 93 (e.g., in the X direction).

In an embodiment as shown in FIG. 2, the first display area DA1 and the second display area DA2 may be in-folded to face each other with respect to the first folding axis FAX1. The second display area DA2 and the third display area DA3 may be in-folded to face each other with respect to the second folding axis FAX2. In an embodiment, the first display area DA1 may be bided toward the second display area DA2 to face each other, and then the third display area DAS may be folded toward the second display area DA2 to face each other. For example, the third display area DA3 may be folded to face the backside of the first display area DA1 that is folded in the first place, to face the first portion 91.

However, embodiments of the present disclosure are not limited thereto. For example, in an embodiment, the first display area DA1 and the second display area DA2, and the second display area DA2 and the third display area DA3 may be out-folded not to face each other. For example, the first display area DA1 may be folded to the second display area DA2 such that the first portion 91 faces the second portion 92 with respect to the first folding axis FAX1. The second display area DA2 may be folded to the third display area DA3 such that the second portion 92 faces the third portion 93 with respect to the second folding axis FAX2.

Alternatively, one of the first display area DA1, the second display area DA2, and the third display area DA3 may be in-folded to face each other with respect to a folding axis, and another may be out-folded not to face each other with respect to the folding axis.

Figure 3:
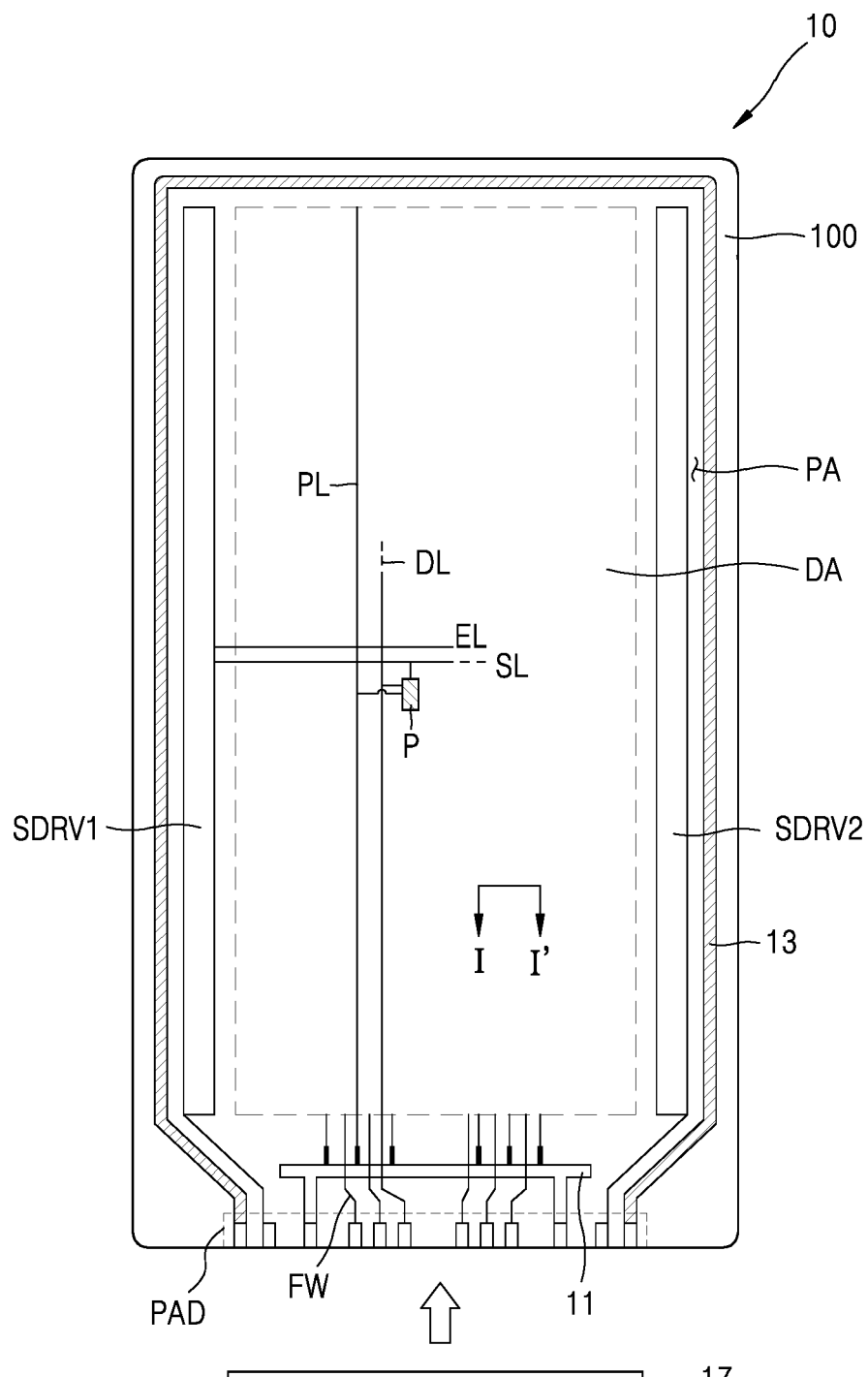
FIG. 3 is a plan view of a display panel that may be included in the display apparatus of FIG. 1 according to an embodiment of the present disclosure.

Hereinafter, for convenience of description, the case where the first display area DA1 and the second display area DA2 are folded to face each other with respect to the first folding axis FAX1, and the second display area DA2 and the third display area DA3 are bided to face each other with respect to the second folding axis FAX2 is mainly described, FIG. 3 is a plan view of the display panel 10 that may be included in the display apparatus of FIG. 1.

Referring to FIG. 3, various kinds of elements constituting, the display panel 10 may be arranged on a substrate 100. The substrate 100 may include the display area DA and the peripheral area PA at least partially surrounding the display area DA (e.g., in the X and/or directions). The pixels P may be arranged in the display area DA. The pixels P may each be implemented by a display element such as an organic light-emitting diode OLED. However, embodiments of the present disclosure are not limited thereto. In an embodiment, each pixel P may emit, for example, red, green, blue, or white light. However, embodiments of the present disclosure are not limited thereto and the color of the light emitted by each pixel P may vary. The display area DA may be protected from external air or moisture and the like by being covered by an encapsulation member.

Pixel circuits driving the pixels P may each be electrically connected to outer circuits arranged in the peripheral area PA. In an embodiment, a first scan driving circuit SDRV1, a second scan driving circuit SDRV2, a terminal part PAD, a driving voltage supply line 11, and a common voltage supply line 13 may be arranged in the peripheral area PA.

The first scan driving circuit SDRV1 may be configured to apply a scan signal to each of the pixel circuits through a scan line SL, the pixel circuits driving the pixels P. The first scan driving circuit SDRV1 may be configured to apply an emission control signal to each of the pixel circuits through an emission control line EL. A second scan driving circuit SDRV2 may be arranged opposite the first scan driving circuit SDRV1 with the display area DA therebetween and approximately parallel to the first scan driving circuit SDRV1. Some of the pixel circuits of the pixels P in the display area. DA may be electrically connected to the first scan driving circuit SDRV1, and the others may be electrically connected to the second scan driving circuit SDRV2.

The terminal part PAD may be arranged on one side of the substrate 100. For example, the terminal part PAD may be disposed on a lower side of the substrate 100 (e.g., in the Y direction). However, embodiments of the present disclosure are not limited thereto. The terminal part. PAD may be exposed and connected to a display circuit board 15 by not being covered b an insulating layer. A display driver 17 may be arranged on the display circuit board 15.

The display driver 17 may be configured to generate a control signal transferred to the first scan driving circuit SDRV1 and the second scan driving circuit SDRV2. In an embodiment, the display driver 17 may be configured to generate a data signal, and the generated data signal may be transferred to the pixel circuit of the pixels P through a fan-out wiring FW and a data line DL connected to the fan-out wiring FW.

The display driver 17 may be configured to supply a driving voltage ELVDD (FIG. 4) to the driving voltage supply line 11 and supply a common voltage ELVSS (FIG. 4) to the common voltage supply line 13, in an embodiment, the driving voltage ELVDD may be applied to the pixel circuit of the pixels P through a driving voltage line PL (FIG. 4) connected to the driving voltage supply line 11, and the common voltage ELVSS may be applied to an opposite electrode of a display element through the common voltage supply line 13.

In an embodiment, the driving voltage supply line 11 may extend in an x-direction below the display area DA. The common voltage supply line 13 may have a loop shape having one open side to partially surround the display area DA. However, embodiments of the present disclosure are not limited thereto.

Figure 4:
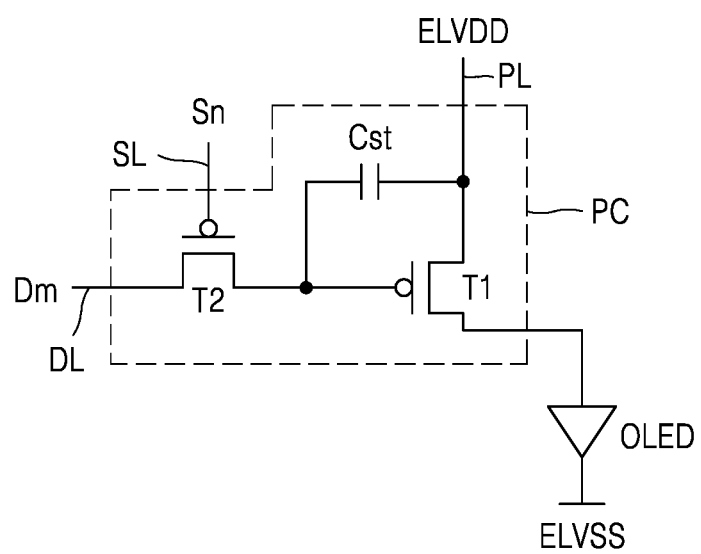
FIGS. 4 and 5 are equivalent circuit diagrams of a pixel circuit driving a pixel according to embodiments of the present disclosure.
Figure 5:
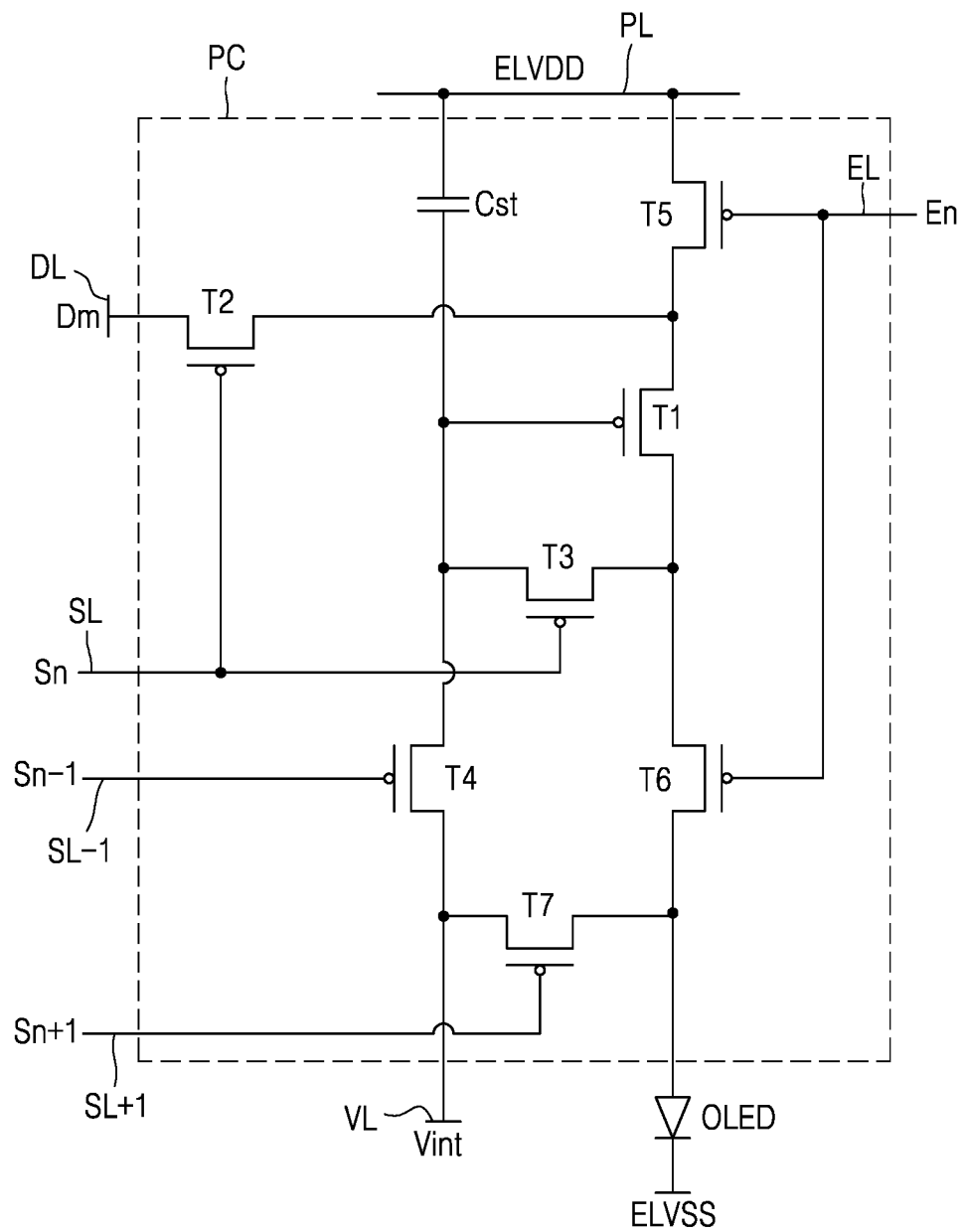

FIGS. 4 and 5 are equivalent circuit diagrams of a pixel circuit PC driving a pixel according to an embodiment.

Referring to FIG. 4, the pixel circuit PC may be connected to the organic light-emitting diode OLED to implement light emission of pixels. In an embodiment, the pixel circuit PC includes a driving thin-film transistor T1, a switching thin-film transistor T2, and a storage capacitor Cst. The switching thin-film transistor T2 may be connected to the scan line SL and the data line DL and configured to transfer a data signal Dm to the driving thin-film transistor T1 according to a scan signal Sn input through the scan line SL The data signal Dm is input through the data line DL.

The storage capacitor Cst may be connected to the switching thin-film transistor T2 and the driving voltage line PL and may store a voltage corresponding, to a difference between the driving voltage ELVDD and a voltage transferred from the switching thin-film transistor T2. The driving voltage ELVDD is supplied through the driving voltage line PL.

The driving thin-film transistor T1 may be connected to the driving voltage line PL and the storage capacitor Cst and configured to control a driving current flowing from the driving voltage line PL to the organic light-emitting diode OLED according to the voltage stored in the storage capacitor Cst. The organic light-emitting diode OLED may emit light having a preset brightness according to the driving current.

Though FIG. 4 illustrates an embodiment in which the pixel circuit PC includes two thin-film transistors and one storage capacitor, embodiments of the present disclosure are not limited thereto and the numbers of the thin-film transistors and storage capacitors may vary.

Referring to FIG. 5, the pixel circuit PC may include the driving thin-film transistor T1, the switching thin-film transistor T2, a compensation thin-film transistor T3, a first initialization thin-film transistor T4, an operation control thin-film transistor T5, an emission control thin-film transistor T6, and a second initialization thin-film transistor T7.

Though FIG. 5 illustrates an embodiment in which each pixel circuit PC includes signal lines SL, SL−1, SL+1, EL, and DL, an initialization voltage line VL, and the driving voltage line PL, embodiments of the present disclosure are not limited thereto. For example, in an embodiment, at least one of the signal lines SL, SL−1, SL+1, EL, and DL, and/or the initialization voltage line VL may be shared by pixel circuits adjacent to each other.

A drain electrode of the driving thin-film transistor T1 may be electrically connected to the organic light-emitting diode OLED through the emission control thin-film transistor T6. The driving thin-film transistor T1 may be configured to receive a data signal Dm and supply the driving current to the organic light-emitting diode OLED according to a switching operation of the switching thin-film transistor T2.

In an embodiment, a gate electrode of the switching thin-film transistor T2 may be connected to the scan line SL, and a source electrode of the switching thin-film transistor T2 may be connected to the data line DL. A drain electrode of the switching thin-film transistor T2 may be connected to a source electrode of the driving thin-film transistor T1 and connected to the driving voltage line PL through the operation control thin-film transistor T5.

The switching thin-film transistor T2 may be turned on according to a scan signal Sn transferred through the scan line SL and may perform a switching operation of transferring a data signal Dm to the source electrode of the driving thin-film transistor T1 through the data line DL.

In an embodiment, a gate electrode of the compensation thin-film transistor T3 may be connected to the scan line SL. A source electrode of the compensation thin-film transistor T3 may be connected to the drain electrode of the driving thin-film transistor T1 and connected to a pixel electrode of the organic light-emitting diode OLED through the emission control thin-film transistor T6. In an embodiment, a drain electrode of the compensation thin-film transistor T3 may be connected to one of electrodes of the storage capacitor Cst, a source electrode of the first initialization thin-film transistor T4, and the gate electrode of the driving thin-film transistor T1, simultaneously. The compensation thin-film transistor T3 may be turned on according to a scan signal Sn transferred through the scan line SL and may diode-connect the driving thin-film transistor T1 by connecting the gate electrode to the drain electrode of the driving thin-film transistor T1.

In an embodiment, a gate electrode of the first initialization thin-film transistor 14 may be connected to the previous scan line SL−1. A drain electrode of the first initialization thin-film transistor 14 may be connected to the initialization voltage line VL. A source electrode of the first initialization thin-film transistor T4 may be connected to one of the electrodes of the storage capacitor Cst, the drain electrode, of the compensation thin-film transistor T3, and the gate electrode of the driving thin-film transistor T1, simultaneously. The first initialization thin-film transistor T4 may be turned on according to a previous scan signal Sn−1 transferred through the previous scan line SL−1 and may perform an initialization operation of initializing the voltage of the gate electrode of the driving thin-film transistor T1 by transferring an initialization voltage Vim to the gate electrode of the driving thin-film transistor T1.

In an embodiment, a gate electrode of the operation control thin-film transistor T5 may be connected to the emission control line EL. A source electrode of the operation control thin-film transistor T5 may be connected to the driving: voltage line PL. A drain electrode of the operation control thin-film transistor T5 may be connected to the source electrode of the driving thin-film transistor T1 and the drain electrode of the switching thin-film transistor T2.

In an embodiment, a gate electrode of the emission control dun-film transistor T6 may be connected to the emission control line EL. A source electrode of the emission control thin-film transistor T6 may be connected to the drain electrode of the driving thin-film transistor T1 and the source electrode of the compensation thin-film transistor T3, A drain electrode of the emission control thin-film transistor To may be electrically connected to the pixel electrode of the organic light-emitting diode OLED. The operation control thin-film transistor T5 and the emission control thin-film transistor T6 are simultaneously turned on according to an emission control signal En transferred through the emission control line EL, the driving voltage ELVDD is transferred to the organic light-emitting diode OLED, and the driving current flows through the organic light-emitting diode OLED.

In an embodiment, a gate electrode of the second initialization thin-film transistor T7 may be connected to the next scan line SL+1. A source electrode of the second initialization thin-film transistor T7 may be connected to the pixel electrode of the organic light-emitting diode OLED. A drain electrode of the second initialization thin-film transistor T7 may be connected to the initialization voltage line VL. The second initialization thin-film transistor T7 may be turned on according to a scan signal Sn+1 transferred through the next scan line SL+1 and may initialize the pixel electrode of the organic light-emitting diode OLED.

Though FIG. 5 shows an embodiment in which the first initialization thin-film transistor T4 and the second initialization thin-film transistor T7 are respectively connected to the previous scan line SL−1 and the next scan line SL+1, embodiments of the present disclosure are not limited thereto. In an embodiment, both the first initialization thin-film transistor T4 and the second initialization thin-film transistor T7 may be connected to the previous scan line SL−1 and driven according to a previous scan signal Sn−1.

The other electrode of the storage capacitor Cst may be connected to the driving voltage line PL One of the electrodes of the storage capacitor Cst may be connected to the gate electrode of the driving thin-film transistor T1, the drain electrode of the compensation thin-film transistor T3, and the source electrode of the first initialization thin-film transistor T4.

The opposite electrode (e.g., a cathode) of the organic, light-emitting diode OLED may receive the common voltage ELVSS. The organic light-emitting diode OLED may emit light by receiving the driving, current from the driving thin-film transistor T1.

The pixel circuit PC is not limited to the number of thin-film transistors, the number of storage capacitors, and the circuit design described with reference to FIGS. 4 and 5. The number of thin-film transistors, the number of storage capacitors, and the circuit design of the pixel circuit PC may be variously modified.

Figure 6:
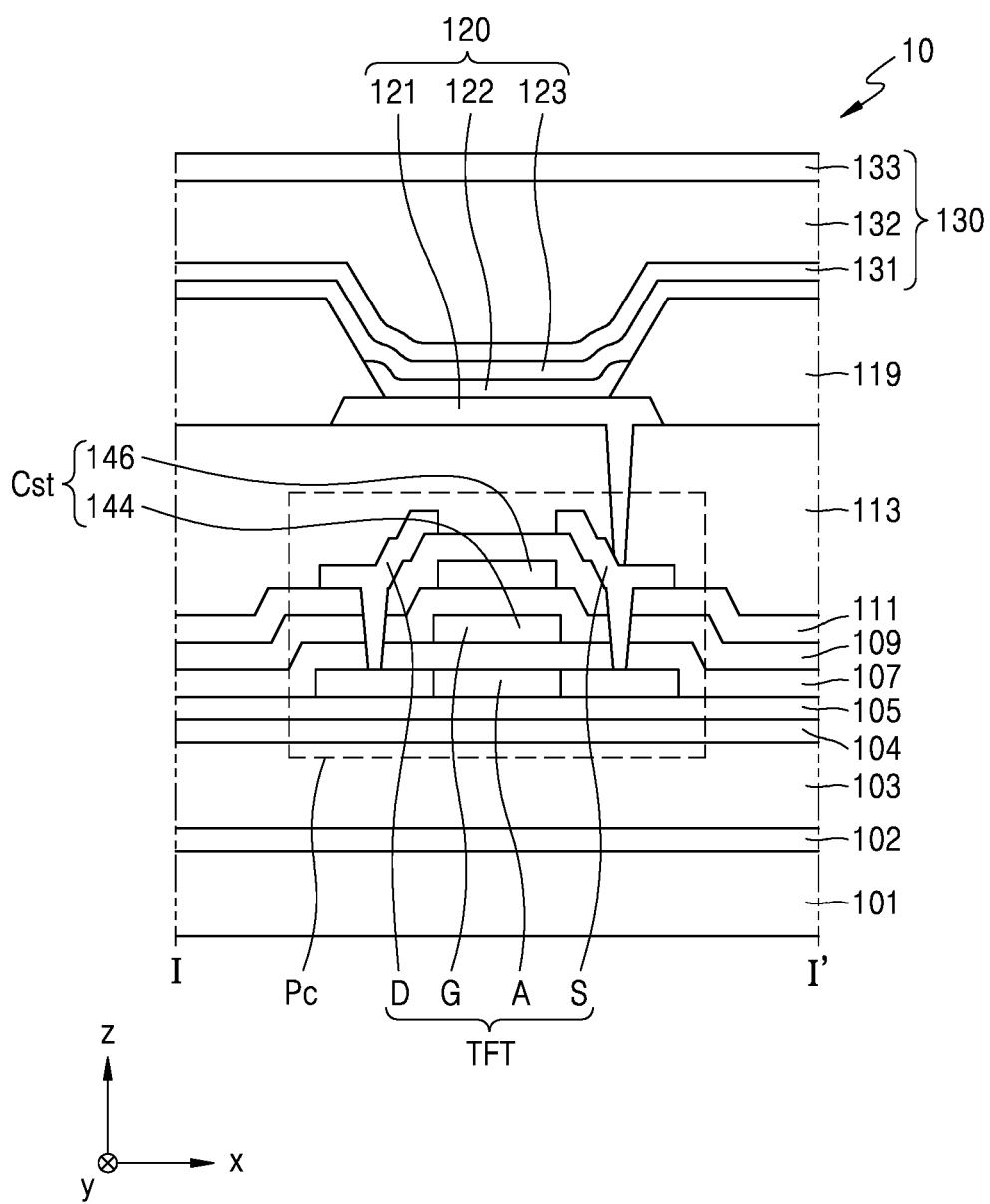
FIG. 6 is a cross-sectional view of a display panel taken along line I-I' of FIG. 3 according to an embodiment of the present disclosure.

FIG. 6 is a cross-sectional view of the display panel 10 according to an embodiment. FIG. 6 corresponds to a cross-section of the display panel 10 taken along line I-I' of FIG. 3.

Hereinafter, a stack structure of the display panel 10 is briefly described with reference to FIG. 6.

The display panel 10 may include a first base layer 101, a first barrier layer 102, a second base layer 103, and a second harrier layer 104 that are sequentially stacked (e.g., in the Z direction). In an embodiment, the first base layer 101 and the second base layer 103 may each include a polymer resin having a relatively high heat resistance. For example, the first base layer 101 and the second base layer 103 may each include at least one compound selected from polyethersulfone, polyacrylate, polyetherimide, polyethylene naphthalate, polyethylene terephthalate, polyphenylene sulfide, polyarylate, polyimide, polycarbonate, cellulose tri acetate, cellulose acetate propionate, and polyarylene ethersulfone. However, embodiments of the present disclosure are not limited thereto. In an embodiment, the first base layer 101 and the second base layer 103 may each include polyimide.

The first barrier layer 102 may be arranged between the first base layer 101 and the second base layer 103 (e.g., in the Z direction). For example, in an embodiment, the first barrier layer 102 may be disposed directly on the first base layer 101 to reduce or block the penetration of foreign materials, moisture, or external air from below.

The second barrier layer 104 may be arranged on the second base layer 103 (e.g., in the Z direction). For example, in an embodiment, the second barrier layer 104 may be arranged directly on the second base layer 103 to reduce or block the penetration of foreign materials, moisture, or external air from below.

In an embodiment, the first barrier layer 102 and the second barrier layer 104 may each include an inorganic insulating material such as at least one compound selected from silicon nitride ($SiN_x$), silicon oxynitride ($SiO_xN_y$), aluminum oxide ($Al_2O_3$), titanium oxide ($TiO_2$), tantalum oxide ($Ta_2O_5$), hafnium oxide ($HfO_2$), and zinc oxide ($ZnO_2$). However, embodiments of the present disclosure are not limited thereto. In an embodiment, the first barrier layer 102 and the second barrier layer 104 may each include the same material. For example, the first barrier layer 102 and the second barrier layer 104 may each include silicon oxide ($SiO_x$). In an embodiment, the first barrier layer 102 and the second barrier layer 104 may include different materials. In an embodiment, the first barrier layer 102 and/or the second barrier layer 104 may be omitted.

A buffer layer 105 may be arranged on the second barrier layer 104 (e.g., disposed directly thereon in the Z direction), The buffer layer 105 may be arranged over the first base layer 101 and the second base layer 103 to reduce or prevent the penetration of foreign materials, moisture, or external air from below, and provide a relatively flat upper surface.

In an embodiment, the buffer layer 105 may include an inorganic insulating material such as at least one compound selected from silicon nitride ($SiO_x$), silicon oxynitride ($SiO_xN_y$), aluminum oxide ($Al_2O_3$), titanium oxide ($TiO_2$), tantalum oxide ($Ta_2O_5$), hafnium oxide ($HfO_2$), and zinc oxide ($ZnO_2$). However, embodiments of the present disclosure are not limited thereto.

In an embodiment, the buffer layer 105 may include, a first buffer layer and a second buffer layer. In an embodiment, the first buffer layer and the second buffer layer may include the same material. In an embodiment, the first buffer layer and the second buffer layer may include different materials. However, embodiments of the present disclosure are not limited thereto. For example, in an embodiment, the buffer layer 105 may include three or more layers.

A thin-film transistor TFT and a storage capacitor Cst may be arranged on the buffer layer 105. The thin-film transistor TFT may include a semiconductor layer A, a gate electrode G, a source electrode S, and a drain electrode D. The storage capacitor Cst may include a lower electrode 144 and an upper electrode 146.

In an embodiment, the semiconductor layer A may be arranged on the buffer layer 105 and may include polycrystalline silicon. In an embodiment, the semiconductor layer A may include amorphous silicon. In an embodiment, the semiconductor layer A may include an oxide of at least one compound selected from indium tin), gallium (Cia), stannum (Sn), zirconium (Zr), vanadium (V), hafnium (Hf), cadmium (Cd), germanium (Ge), chromium (Cr), titanium (Ti), and zinc (Zn). However, embodiments of the present disclosure are not limited thereto. The semiconductor layer A may include a channel region, a source region, and a drain region. The source region and the drain region are doped with impurities.

A first insulating layer 107 may be arranged to cover the semiconductor layer A. In an embodiment, the first insulating layer 107 may include an inorganic insulating material such as at least one compound selected from silicon nitride (SiO$_x$), silicon nitride (SiN$_x$), silicon oxynitride (SiO$_x$N$_y$), aluminum oxide (Al$_2$O$_3$), titanium oxide (TiO$_2$), tantalum oxide (Ta$_2$O$_5$), hafnium oxide (HfO$_2$), and zinc oxide (ZnO$_2$). However, embodiments of the present disclosure are not limited thereto. The first insulating layer 107 may include a single layer or a multi-layer including the above inorganic ins mating materials.

A gate electrode G may be arranged on the first insulating layer 107 to overlap the semiconductor layer A. In an embodiment, the gate electrode G may include molybdenum (Mo), aluminum (Al), copper (Cu), titanium (Ti), and the like and include a single layer or a multi-layer including the above materials. However, embodiments of the present disclosure are not limited thereto. In an embodiment, the gate electrode G may be a single Mo layer.

A second insulating layer 109 may be disposed to cover the gate electrode G. In an embodiment, the second insulating layer 109 may include an inorganic insulating material such as at least one compound selected from silicon nitride (SiO$_x$), silicon nitride (SiN$_x$), silicon oxynitride (SiO$_x$N$_y$), aluminum oxide (Al$_2$O$_3$), titanium oxide (TiO$_2$), tantalum oxide (Ta$_2$O$_5$), hafnium oxide (HfO$_2$), and zinc oxide (ZnO$_2$). However, embodiments of the present disclosure are not limited thereto. The second insulating layer 109 may include a single layer or a multi-layer including the above inorganic insulating materials.

The upper electrode 146 of the storage capacitor Cst may be arranged on the second insulating layer 109 (e.g., disposed directly thereon in the Z direction). The upper electrode 146 may overlap the gate electrode G therebelow. The gate electrode G and the upper electrode 146 overlapping each other with the second insulating layer 109 therebetween may constitute the storage capacitor Cst. In an embodiment, the gate electrode G may be the lower electrode 144 of the storage capacitor Cst. However, embodiments of the present disclosure are not limited thereto. For example, in an embodiment, the lower electrode 144 of the storage capacitor Cst may be provided as a separate independent element from the gate electrode G.

In an embodiment, the upper electrode 146 may include at least one compound selected from aluminum (Al), platinum (Pt), palladium (Pd), silver (Ag), magnesium (Mg), gold (Au), nickel (Ni), neodymium (Nd), iridium (Ir), chrome (Cr), calcium (Ca), molybdenum (Mo), titanium (Ti), tungsten (W), and copper (Cu) and include a single layer or a multi-layer including the above materials.

A third insulating layer 111 may be arranged to cover the upper electrode 146. In an embodiment, the third insulating layer 111 may include an inorganic insulating material such as at least one compound selected from silicon nitride (SiO$_x$), silicon nitride (SiN$_x$), silicon oxynitride (SiO$_x$N$_y$), aluminum oxide (Al$_2$O$_3$), titanium oxide (Ta$_2$O$_2$), tantalum oxide (Ta$_2$O$_5$), hafnium oxide (HfO$_2$), and zinc oxide (ZnO$_2$). However, embodiments of the present disclosure are not limited thereto. The third insulating layer 111 may include a single layer or a multi-layer including the above inorganic insulating materials.

The source electrode S and the drain electrode D may be arranged on the third insulating, layer Ill (e.g., disposed directly thereon in the Z direction). The source electrode S and the drain electrode D may each extend through via holes extending through the first to third insulating layers 107, 109, 111 to directly contact the source region and the drain region of the semiconductor layer A, respectively. In an embodiment, the source electrode S and the drain electrode D may include a conductive material including molybdenum (Mo), aluminum (Al), copper (Cu), titanium (Ti), and the like and include a single layer or a multi-layer including the above materials. However, embodiments of the present disclosure are not limited thereto. In an embodiment, the source electrode S and the drain electrode D may each have a multi-layered structure of titanium (Ti)/aluminum (Al)/titanium (Ti).

A planarization layer 113 may be arranged to cover the source electrode S and the drain electrode D. The planarization layer 113 may have a relatively flat upper surface such that a pixel electrode 121 arranged thereon ma be formed flat.

The planarization layer 113 may include an organic material or an inorganic material and have a single-layered structure or a multi-layered structure. In an embodiment, the planarization layer 113 may include a general-purpose polymer such as at least one compound selected from benzocyclobutene (BCB), polyimide, hexamethyldisiloxane (HMDSO), polymethylmethacrylate (PMMA) or polystyrene (PS), polymer derivatives having a phenol-based group, an acryl-based polymer, an imide-based polymer, an aryl ether-based polymer, an amide-based polymer, a fluorine-based polymer, a p-xylene-based polymer, and a vinyl alcohol-based polymer. In an embodiment, the planarization layer 113 may include an inorganic insulating material such as at least one compound selected from silicon nitride (SiO$_x$), silicon nitride (SiN$_x$), silicon oxynitride (SiO$_x$N$_y$), aluminum oxide (Al$_2$O$_3$), titanium oxide (TiO$_2$), tantalum oxide (Ta$_2$O$_5$), hafnium oxide (HfO$_2$), and zinc oxide (ZnO$_2$). However, embodiments of the present disclosure are not limited thereto. In an embodiment, when forming the planarization layer 113, to provide a relatively flat upper surface after forming a layer, chemical mechanical polishing may be performed on the upper surface of the layer.

The planarization layer 113 may include a via hole exposing one of the source electrode S and the drain electrode D of the thin-film transistor TFT, The pixel electrode 121 may be electrically connected to the thin-film transistor TFT by directly contacting the source electrode S or the drain electrode D through the via hole of the planarization layer 113.

In an embodiment, the planarization layer 113 may include a first planarization layer and a second planarization layer. However, embodiments of the present disclosure are not limited thereto. For example, in some embodiments, the planarization layer 113 may include three or more layers. In an embodiment, the first planarization layer and the second planarization layer may include the same material. In an embodiment, the first planarization layer and the second planarization layer may include different materials. Since the planarization layer 113 includes the first planarization layer and the second planarization layer, the display apparatus may have an increased degree of integration.

The pixel electrode 121 may be arranged on the planarization layer 113 (e.g., disposed directly thereon in the 1 direction). In an embodiment, the pixel electrode 121 may include a conductive oxide such as indium tin oxide (ITO), indium zinc oxide (IZO), zinc oxide (ZnO), indium oxide (In₂O₃), indium gallium oxide (IGO), or aluminum zinc oxide (AZO). The pixel electrode 121 may include a reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof. However, embodiments of the present disclosure are not limited thereto. For example, the pixel electrode 121 may include a structure including layers on/under the reflective layer, such as layers including. ITO, IZO, ZnO, or In₂O₃, in this embodiment, the pixel electrode 121 may have a structure of ITO/Ag/ITO that are stacked.

A pixel-defining layer 119 may be arranged on the planarization layer 113 (e.g., disposed directly thereon in the Z direction). In an embodiment, the pixel-defining layer 119 may be arranged on the planarization layer 113 and may cover lateral edges of the pixel electrode 121. An opening may be defined in the pixel-defining layer 119 that exposes at least a portion of the pixel electrode 121.

The pixel-defining layer 119 may prevent, arcs and the like from occurring at the edges of the pixel electrode 121 by increasing a distance between the edges of the pixel electrode 121 and an opposite electrode 123 that is disposed over the pixel, electrode 121. In an embodiment, the pixel-defining layer 119 may include an organic insulating material such as polyimide, an acrylic resin, benzocyclobutene, hexamethyldisiloxane (HMDSO), a phenolic resin, and the like and may be formed by using spin coating and the like. However, embodiments of the present disclosure are not limited thereto.

In an embodiment, a spacer for preventing mask chopping ma be further arranged on the pixel-defining layer 119. The spacer may be formed as one body with the pixel-defining layer 119, As an example, the spacer and the pixel-defining layer 119 may be formed simultaneously during the same process that uses a half-tone mask.

In an embodiment, an intermediate layer 122 may be arranged inside the opening of the pixel-defining layer 119 to correspond to the pixel electrode 121. The intermediate layer 122 may include an emission layer. In an embodiment, the emission layer may include a polymer organic material or a low-molecular weight organic material and emit red, green, blue, or white light. However, embodiments of the present disclosure are not limited thereto.

In an embodiment, the intermediate layer 122 may further include an organic functional layer arranged on and/or under the emission layer. The organic functional layer may include a first functional layer and/or a second functional layer. However, embodiments of the present disclosure are not limited thereto. For example, in an embodiment, the first functional layer and/or the second functional layer may be omitted.

In an embodiment, the first functional layer may be arranged under the emission layer (e.g., in the Z direction). The first functional layer may include a single layer or a multi-layer including an organic material. The first functional layer may include a hole transport layer (HTL) which has a single-layered structure. Alternatively, the first functional layer may include a hole injection layer (HIL) and an HTL.

The second functional layer may be arranged on the emission layer (e.g., above the emission layer in the Z direction). The second functional layer may include a single layer or a multi-layer including an organic material. The second functional layer may include an electron transport layer (ETL) and/or an electron injection layer (EIL).

The opposite electrode 123 may be arranged on the intermediate layer 122 (e.g., disposed directly thereon in the Z direction). The opposite electrode 123 may include a conductive material having a low work function. For example, in an embodiment, the opposite electrode 123 may include a (semi) transparent layer including silver (Ag), magnesium (Mg), aluminum (Al), platinum (Pt), palladium (Pd), gold (Au), nickel (Ni), neodymium (Nd), iridium (Ir), chrome (Cr), lithium (Li), calcium (Ca), or an alloy thereof. Alternatively, the opposite electrode 123 may further include a layer on the (semi) transparent layer including, the above material, the layer including ITO, IZO, ZnO, or In₂O₃.

In an embodiment, layers from the pixel electrode 121 to the opposite electrode 123 may constitute an organic light-emitting diode 120.

In an embodiment, a capping layer may be disposed on the opposite electrode 123. The capping layer may include an organic material. The capping layer may be a layer prepared to protect the opposite electrode 123, and simultaneously, increase a light extracting efficiency. The capping layer may include an organic material having a higher refractive index than that of the opposite electrode 123.

A thin-film encapsulation layer 130 as a sealing member may be arranged on the organic light-emitting diode 120 of the display apparatus 1. For example, the organic light-emitting diode 120 may be sealed by the thin-film encapsulation layer 130, The thin-film encapsulation layer 130 may be arranged on the opposite electrode 123 (e.g., disposed directly thereon in the Z direction). The thin-film encapsulation layer 130 may prevent or reduce the penetration of external moisture or foreign materials into the organic light-emitting diode 120.

The thin-film encapsulation layer 130 may include at least one inorganic layer and at least one organic layer. In an embodiment, the thin-film encapsulation layer 130 may include a first inorganic layer 131, an organic layer 132, and a second inorganic layer 133 that are sequentially stacked e.g., in the Z direction). However, embodiments of the present disclosure are nut limited thereto and the number of organic encapsulation layers, the number of inorganic encapsulation layers, and the stacking order may be changed.

The first inorganic layer 131 and the second inorganic layer 133 may each include at least one inorganic insulating material selected from silicon nitride ($SiO_x$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_2$) and may be formed by chemical vapor deposition (CND) and the like. However, embodiments of the present disclosure are not limited thereto. In an embodiment; the organic layer 132 may include a polymer-based material. For example, the polymer-based material may include a silicon-based resin, an acryl-based resin, an epoxy-based resin, polyimide, and polyethylene. However, embodiments of the present disclosure are not limited thereto.

Figure 7:
FIG. 7 is a cross-sectional of a display apparatus according to an embodiment of the present disclosure.
Figure 8:
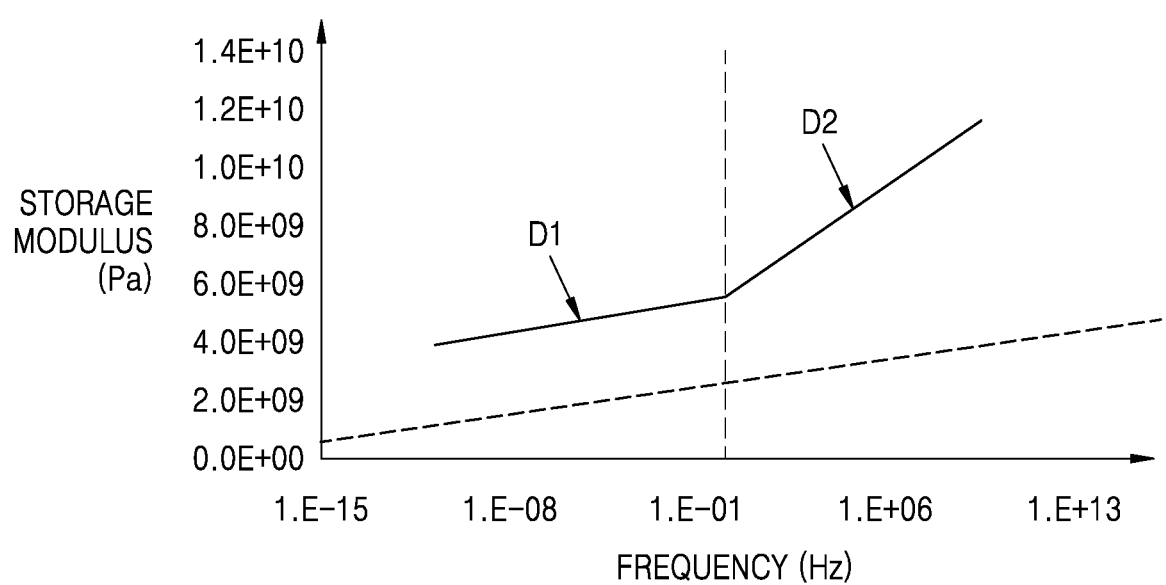
FIG. 8 is a graph fir explaining modulus characteristics according frequencies of a display apparatus according to an embodiment of the present disclosure.

FIGS. 7 and 8 are cross-sectional views of a display apparatus according to an embodiment.

Referring to FIG. 7, the display apparatus 1 may include the display panel 10 and a cover window CW.

The cover window CW may protect the display panel 10. In an embodiment, the cover window CW may cover one side e.g., a first side in the Z direction of FIG. 7) of the display panel 10.

In an embodiment, the cover window CW may be a flexible window. For example, the cover window CW may protect the display panel 10 while easily deforming in response to an external force without cracking and the like. In an embodiment, the cover window CW may include at least one material selected, from glass, sapphire, or plastic. However, embodiments of the present disclosure are not limited thereto. For example, the cover window CW may be ultra thin glass (UTG). In an embodiment, the cover window CW may have a structure in which a flexible polymer layer is arranged on one side of a glass substrate, or may include only a polymer layer.

The display panel 10 may be arranged on a first side of the cover window CW (e.g., in the Z direction), and a first film 310 may be arranged on a second side of the cover window CW that is opposite to the first side. The first film 310 may protect the cover window CW and the display panel 10 covered, by the cover window CW.

In an embodiment, a first adhesive layer 510 may be arranged between the first film 310 and the second side of the cover window CW (e.g., in the Z direction). In an embodiment, the first adhesive layer 510 may include at least one material selected from a pressure sensitive adhesive (PSA), an optically clear adhesive (OCA), and an optically clear resin (OCR) to attach the first film 310 to the cover window CW. However, embodiments of the present disclosure are not limited thereto.

In addition, a second adhesive layer 520 may be arranged between the first side of the cover window CW and the display panel 10 (e.g., in the Z direction). In an embodiment, the second adhesive layer 520 may include at least one material selected from a pressure sensitive adhesive (PSA), an optically clear adhesive (OCA), and an optically clear resin (OCR) to attach the display panel 10 to the cover window CW. However, embodiments of the present disclosure are not limited thereto.

A third film 330 and a fourth film 340 may be sequentially arranged on a first side of the display panel 10 that is opposite to a second side of the display panel 10 to which the cover window CW is attached. The third film 330 and the fourth film 340 may protect the display panel 10 from external impacts.

In addition, in an embodiment, a support layer 350 may be arranged on a first side (e.g., a side in the Z direction of FIG. 7) of the fourth film 340. The first side of the fourth film 340 may be a side farthest away from the third film 330 (e.g., in the Z direction). In an embodiment, the support layer 350 may include, for example, metal. Accordingly, the support layer 350 may maintain a fixed shape of the display panel 10 in a foldable or flexible state.

In an embodiment, adhesive layers 540, 550, and 560 may be respectively arranged between (e.g., directly therebetween in the Z direction) a first side of the display panel 10 and the third film 330, between the third film 330 and the fourth film 340, and between the fourth film 340 and the support layer 350. The adhesive layers 540, 550, and 560 may attach two layers adjacent to each other. In an embodiment, the adhesive layers 540, 550, and 560 may include at least one material selected from a pressure sensitive adhesive (PSA), an optically clear adhesive (OCA), and an optically clear resin (OCA). However, embodiments of the present disclosure are not limited thereto.

FIG. 8 is a graph for explaining modulus characteristics according to frequencies of a display apparatus according to an embodiment. FIG. 8 shows storage modulus values according to frequencies of the first film 3110. Frequencies (Hz) denote frequencies due to external impacts on the display apparatus. For example, in an embodiment, frequencies may be frequencies of the first film 310 due to a pen that is dropped on the display apparatus 1 (hereinafter, a "pen drop"). In this embodiment, when a height from which a pen is dropped increases, the external impacts increase, and thus, high frequencies may be exhibited.

Referring, to FIG. 8, a solid line represents the first film 310 according to an embodiment of the present disclosure and a dashed line represents a general film.

In the first film 310, when frequencies (Hz) increase due to an external impact, a storage modulus (G) may increase. In addition, the first film 310 may include a first rate of change D1 of the storage modulus G as the frequency changes in a frequency region less than a reference frequency and a second rate of change D2 of the storage modulus U as the frequency changes in a frequency region greater than the reference frequency. In an embodiment as illustrated in FIG. 8, the reference frequency may be about 1 Hz. However, embodiments of the present disclosure Are not limited thereto. Here, the rate of Change denotes a value of a change in the storage modulus G according to a change in the frequencies. For example, the rate of change denotes the slope of a line in the graph of the storage modulus G with respect to the frequencies in FIG. 8.

In an embodiment, the first rate of change may be different from the second rate of change. For example, the first rate of change D1 and the second rate of change D2 may have different values. In an embodiment, the first rate of change D1 may be less than the second rate of change D2.

Accordingly, in an embodiment in which external impacts are relatively weak or there are no external impacts, that is, for example, in an embodiment where the frequency is less than about if, the first film 310 has a relatively to storage modulus U and the display apparatus may be easily folded. For example, when the first display area DA1 and the second display area DA2 are in-folded to face each other, and the second display area DA2 and the third display area DA3 are in-folded to face each other, stress applied to the overlapping area, particularly, the second display area DA2, may be reduced.

In addition, in an embodiment in which external impacts such as a pen drop is applied to the display apparatus 1, that is, for example, in an embodiment in which the frequency is 1 Hz or more, as the strength of impacts increases the first film 310 may have a rapidly increased storage modulus G, and thus, an impact resistance of the display apparatus 1 may be increased. In comparison, the general film has a constant rate of change, that is, a constant slope, regardless of the reference frequency as shown in FIG. 8, Therefore, the storage modulus G does not rapidly increase even when impacts are applied to the display apparatus 1.

Figure 9:
FIG. 9 is a cross-sectional view of a display apparatus according to an embodiment of the present disclosure.

In an embodiment, the first film 310 may have a tensile modulus in a range of about 4 GPa to about 11 GPa at a temperature of 25° C. For example, the first film 310 may have a tensile modulus in a range of about 6.5 GPa and less than about 9.5 GPa at room temperature of 25° C. In addition, in an embodiment, the first film 310 may include a material including polyimide or polyamide. The first film 310 may include a transparent material having a light transmittance of about 90% or more, FIG. 9 is a cross-sectional view of a display apparatus according to an embodiment. The present embodiment is a modified embodiment of the above embodiment shown in FIG. 8. Hereinafter, differences from the above embodiment are mainly described and a repeated description of similar or identical elements may be omitted for convenience of explanation.

Referring, to FIG. 9, the first film 310 may be formed as one body with the cover window CW. For example, a first adhesive layer 510 (FIG. 7) may not be included between the second side of the cover window CW and the first film 310 for attachment of the first film 310 to the cover window CW. In an embodiment, the first film 310 may be formed to directly contact the cover window CW by coating spraying. Accordingly, since the first adhesive layer 510 is omitted, the thickness of the display apparatus 1 may be reduced and the weight of the display apparatus 1 may be reduced.

Figure 10:
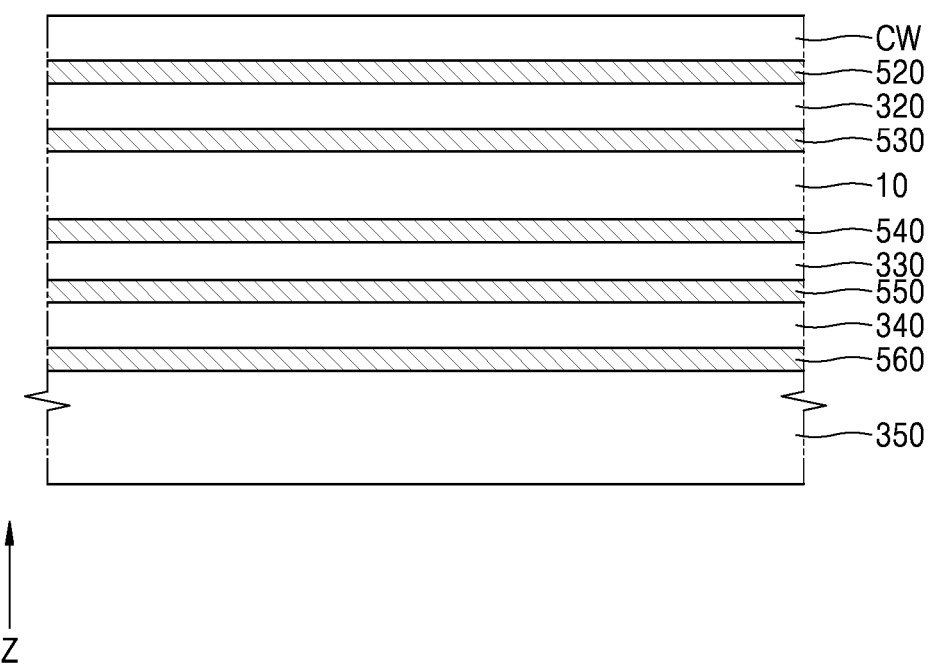
FIGS. 10 and 11 are cross-sectional views of a display apparatus according to embodiments of the present disclosure.

FIG. 10 is a cross-sectional view of a display apparatus according to an embodiment. Hereinafter, differences from the above embodiment are mainly described and a repeated description of similar or identical elements may be omitted for convenience of explanation.

Referring to FIG. 10, the cover window CW may cover the display panel 10 and a first film 310 (FIG. 7) may not be disposed on the second surface of the cover window CW. A second film 320 may be arranged between the first surface of the cover window CW and the display panel 10 (e.g., in the Z direction). The second film 320 may absorb impacts, and preferably, protect the display panel 10 from external impacts.

The second film 320 may be attached to the cover window CW by the second adhesive layer 520 which is disposed between the second film 320 and the first surface of the cover window CW (e.g., in the Z direction). In addition, a third adhesive layer 530 may be arranged between the second film 320 and the second side of the display panel 10 (e.g., in the Z direction), and thus, the second film 320 may be attached to the display panel 10. Similar to the above adhesive layers, in an embodiment, the third adhesive layer 530 may include at least one material selected from a pressure sensitive adhesive (PSA), an optically clear adhesive (OCA), and an optically clear resin (OCR). However, embodiments of the present disclosure are not limited thereto.

In an embodiment, a thickness (the length in the Z direction) of the second film 320 may be in a range of about 50 μm to about 75 μm. In an embodiment in which the thickness of the second film 320 is less than about 50 μm, the display panel 10 may be damaged due to external impacts on the display panel 10. In contrast, when the thickness of the second film 320 exceeds about 75 μm, the folding characteristics of the display apparatus may be deteriorated. Accordingly, in an embodiment in which the thickness of the second film 320 is in a range of about 50 μm to about 75 μm, damage to the display panel due to external impacts may be prevented or reduced, and simultaneously, the display apparatus 1 may be easily folded.

The second film 320 may be a film having a relatively high elasticity and a relatively high restoration. In an embodiment, the second film 320 may include elastomer. Since the second film 320 includes elastomer, stress occurring while the display apparatus 1 is bent or folded, particularly, stress applied to the second display area DA2, may be reduced. Accordingly, the folding characteristics of the display apparatus 1 may be increased, and simultaneously, repulsion and restoration characteristics of the display apparatus 1 may be increased.

In an embodiment, the second film 320 may include at least one material selected from thermoplastic polyurethane, thermosetting polyurethane, and polyetherblock amide. However, embodiments of the present disclosure are nor limited thereto.

In an embodiment, an elastic modulus of the second film 320 may be in a range of about 100 MPa to about 600 MPa at a temperature of about 85° C. in addition, an elastic modulus of the second film 320 may be in a range of about 600 MPa to about 1000 MPa at a temperature of about 25° C. In addition, an elastic modulus of the second film 320 may be in a range of about 1000 MPa to about 1500 MPa at a temperature of about −20° C.

Since the second film 320 has the above-described modulus, stress applied to an overlapping region, such as the second display area DA2, may be reduced in the display apparatus 1 that is folded, such as the display apparatus 1 in which the first display area DA1 and the second display area DA2 are in-folded to face each other, and the second display area DA2 and the third display area DA3 are in-folded to face each other as described above.

Figure 11:
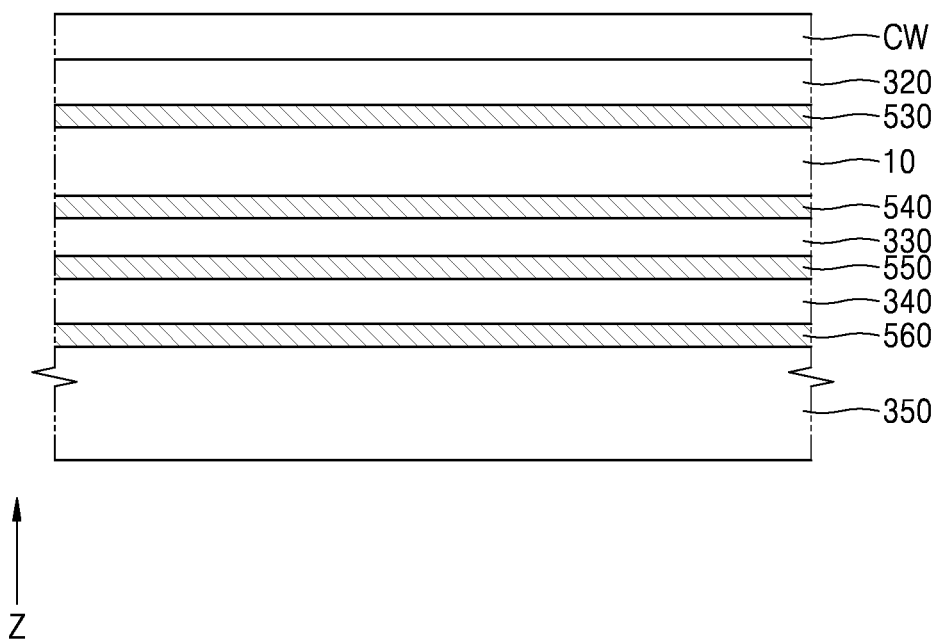

FIG. 11 is a cross-sectional view of a display apparatus according to an embodiment. The present embodiment is a modified embodiment of the above embodiment shown in FIG. 10. Hereinafter, differences from the above embodiment shown in FIG. 10 are mainly described and a repeated description of similar or identical elements may be omitted for convenience of explanation.

Referring to FIG. 11, the second film 320 may be formed as one body with the cover window CW. For example, second adhesive layer 520 (FIG. 10) may not be disposed between the first surface of the cover window CW and the second film 320 for attachment thereto, in an embodiment, the second film 320 may be formed to directly contact the cover window CW by coating spraying. Accordingly, since the second adhesive layer 520 is omitted, the thickness of the display apparatus 1 may be reduced and the weight of the display apparatus 1 may be reduced, FIG. 12 is a cross-sectional view of a second film according to an embodiment.

Figure 12:
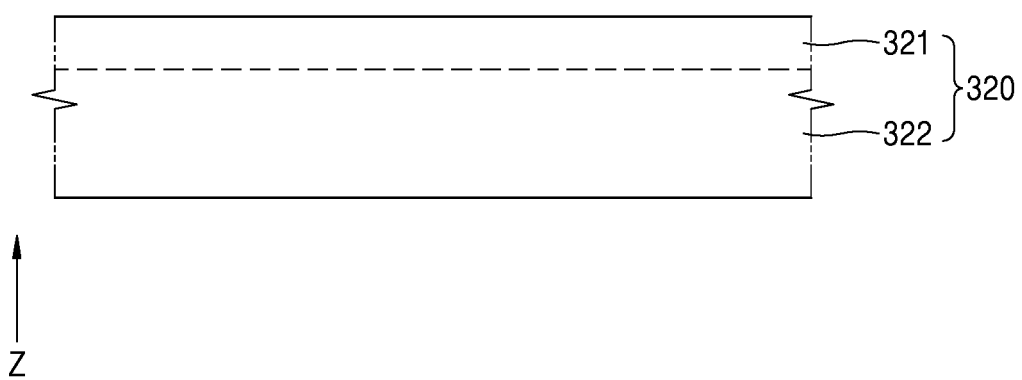
FIG. 12 is a cross-sectional view of a film according to an embodiment of the present disclosure; and FIGS. and 14 are cross-sectional views of a display apparatus according to embodiments of the present disclosure.

Referring to FIG. 12, the second film 320 may be provided as a plurality of layers. In an embodiment, the second film 320 may include a first layer 321 and a second layer 322. The first layer 321 is adjacent to the cover window CW (e.g., immediately adjacent in the Z direction), and the second layer 322 is adjacent to the display panel 10 (e.g., in the Z direction). However, embodiments of the present disclosure are not limited thereto. For example, in an embodiment, the second film 320 may include two or more layers. Hereinafter, an embodiment in which the second film 320 includes the first layer 321 and the second layer 322 is mainly described.

In an embodiment, the modulus of the first layer 321 may be greater than the modulus of the second layer 322. In this embodiment, the thickness (e.g., length in the Z direction) of the first layer 321 may be less than the thickness (e.g., length in the Z direction) of the second layer 322. For example, the first layer 321 having a relatively large modulus may be formed to have a relatively small thickness, and the second layer 322 having a relatively small modulus may be formed to have a relatively large thickness. Accordingly, the second film 320 may have impact-absorbing characteristics, and simultaneously, have flexible characteristics. In an embodiment in which the second film 320 includes three or more layers, a first layer that is immediately adjacent to the cover window CW may have the largest elastic modulus among the plurality of layers.

In an embodiment, the first layer 321 may be formed on the second layer 322 by coating spraying. Accordingly, since an adhesive, layer having a different physical property is not arranged between the first layer 321 and the second layer 322 (e.g., in the Z direction), the behavioral characteristics of the second film 320 may be maintained. In addition, since an adhesive layer is not required, the thickness of the display apparatus 1 may be reduced.

Figure 13:
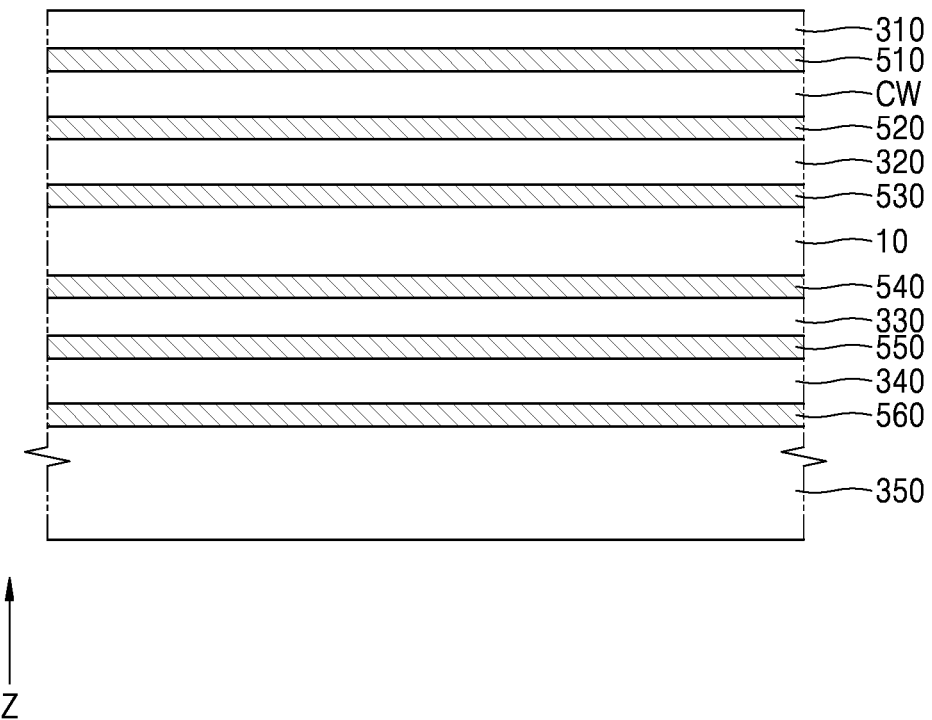

FIG. 13 is a cross-sectional view of a display apparatus according to an embodiment. Hereinafter, differences from the above embodiment are mainly described and a repeated description of similar or identical elements may be omitted for convenience of explanation.

Referring to FIG. 13, the first film 310 may be arranged on the second side of the cover window CW, and the second film 320 may be arranged on a first side of the cover window CW. In addition, the display panel 10 may be arranged on a first side of the second film 320 that is farthest from the cover window CW (e.g., in the Z direction). For example, in the display apparatus 1, the first film 310, the cover window CW, the second film 320, and the display panel 10 may be arranged in one direction (e.g., the Z direction).

In an embodiment, the first adhesive layer 510, the second adhesive layer 520, and the third adhesive layer 530 may be respectively arranged (e.g., in the Z direction) between the first film 310 and the cover window CW, the cover window CW and the second film 320, and the cover window CW and the display panel 10. The first adhesive layer 510, the second adhesive layer 520, and the third adhesive layer 530 may connect respective members.

Accordingly, while the display apparatus 1 is easily folded, durability against external impacts may be increased. In addition, in an embodiment in which the display apparatus 1 is folded, particularly, two opposite sides of the display apparatus 1 are in-folded, stress applied thereto may be reduced.

Figure 14:
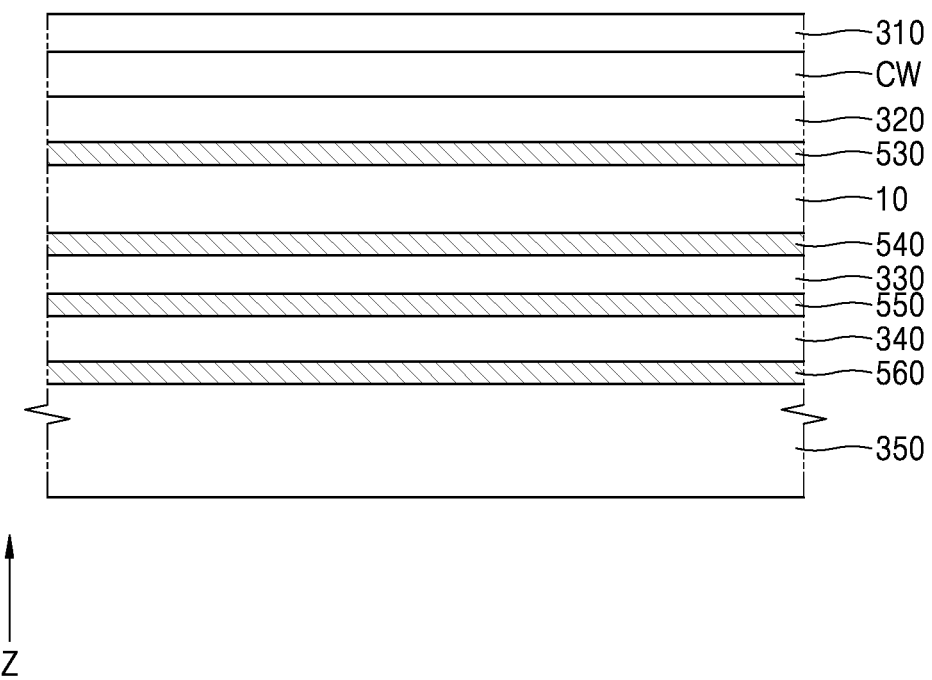

FIG. 14 is a cross-sectional view of a display apparatus according to an embodiment. The present embodiment is a modified embodiment of the above embodiment shown in FIG. 13. Hereinafter, differences from the above embodiment shown in FIG. 13 are mainly described and a repeated description of similar or identical elements may be omitted for convenience of explanation.

Referring to FIG. 14, the first film 310, the cover window CW, and the second film 320 may be formed as one body. For example, the first adhesive layer 510 and the second adhesive layer 520 may not be respectively arranged between the first film 310 and the cover window CW (e.g., in the Z direction) and between the cover window CW and the second film 320 (e.g., in the Z direction). In an embodiment, the first film 310 and the second film 320 may not be attached to the cover window CW by an adhesive layer and may each be formed on the cover window CW by coating spraying. Accordingly, since adhesive layers are omitted, the thickness of the display apparatus 1 may be reduced and the weight of the display apparatus 1 may be reduced. In addition, a manufacturing process may be simplified.

Since a display apparatus according to embodiments of the present disclosure includes a film having a relatively high modulus on a cover window, damage to a display panel due to external impacts may be prevented or reduced, and simultaneously, folding or bending characteristics and impact resistance characteristics of the display apparatus may be increased.

Effects of the present disclosure are not limited to the above mentioned effects and other effects not mentioned may be clearly understood by those of ordinary skill in the art from the following claims.

It should be understood that embodiments described herein should be considered in a descriptive sense only and not for purposes of limitation. Descriptions of features or aspects within each embodiment may be considered as available for other similar features or aspects in other embodiments. While one or more embodiments of the present disclosure have been described with reference to the figures, it will be understood by those of ordinary skill in the art that various changes in form and details may be made therein without departing from the spirit and scope of the present disclosure.

What is claimed is:

1. A display apparatus comprising:
   a display panel;
   a cover window covering the display panel; and
      a first film arranged over the cover window, the first film having a first rate of change of a storage modulus at frequencies due to external impacts that are below a reference frequency and a second rate of change of the storage modulus at frequencies due to external impacts that are above the reference frequency, wherein the first rate of change is different from the second rate of change.

2. The display apparatus of claim 1, wherein the reference frequency is about 1 Hz.

3. The display apparatus of claim 1, wherein the first rate of change is less than the second rate of change.

4. The display apparatus of claim 1, wherein a tensile modulus of the first film is in a range of about 4 GPa to about 11 GPa at 25° C.

5. The display apparatus of claim 1, wherein the first film is arranged on a first side of the cover window, and the display panel is arranged on a second side of the cover window that is opposite to the first side of the cover window.

6. The display apparatus of claim 1, wherein a light transmittance of the first film is at least about 90%.

7. The display apparatus of claim 1, wherein:
   the display panel includes a first folding axis and a second folding axis arranged in a first direction, the first folding axis extends parallel to the second folding axis; and
   the display panel is configured to be in-folded around the first folding axis and the second folding axis.

8. The display apparatus of claim 1, further comprising a second film arranged between the display panel and the cover window, the second film is configured to absorb impacts.

9. The display apparatus of claim 8, wherein at least one of the first film and the second film is coated on the cover window.

10. The display apparatus of claim 8, wherein the second film includes an elastomer.

11. The display apparatus of claim 8, wherein a thickness of the second film is in a range of about 50 μm to about 75 μm.

12. The display apparatus of claim 8, wherein an elastic modulus of the second film at 85° C. is in a range of about 100 MPa to about 600 MPa.

13. The display apparatus of claim 8, wherein an elastic modulus of the second film at 25° C. is in a range of about 600 MPa to about 1000 MPa.

14. The display apparatus of claim 8, wherein an elastic modulus of the second film at −20° C. is in a range of about 1000 MPa to about 1500 MPa.

15. The display apparatus of claim 8, wherein:
the second film includes a plurality of layers; and
an elastic modulus of a first layer that is immediately adjacent to the cover window has a largest elastic modulus among the plurality of layers.

16. The display apparatus of claim 15, wherein:
the second film includes a first layer adjacent to the cover window and a second layer adjacent to the display panel; and
a thickness of the first layer is less than a thickness of the second layer.

17. The display apparatus of claim 8, wherein:
the display panel includes a first folding axis and a second folding axis arranged in a first direction, the first folding axis extends parallel to the second folding axis; and
the display panel is configured to be in-folded around the first folding axis and the second folding axis.

18. A display apparatus comprising:
a display panel;
a cover window covering the display panel; and
a second film arranged between the display panel and the cover window, the second film is configured to absorb impacts, wherein the second film includes a plurality of layers and an elastic modulus of a first layer that is immediately adjacent to the cover window has a largest elastic modulus among the plurality of layers,
wherein the display panel, the cover window, and the second film are configured to be in-folded around a first folding axis and a second folding axis arranged in a first direction, the first folding axis extends parallel to the second folding axis.

19. The display apparatus of claim 18, wherein an elastic modulus of the second film at 85° C. is in a range of about 100 MPa to about 600 MPa.

20. The display apparatus of claim 18, wherein an elastic modulus of the second film at 25° C. is in a range of about 600 MPa to about 1000 MPa.

21. The display apparatus of claim 18, wherein an elastic modulus of the second film at −20° C. is in a range of about 1000 MPa to about 1500 MPa.

22. The display apparatus of claim 18, wherein:
the plurality of layers includes a second layer; and
a thickness of the first layer is less than a thickness of the second layer.

* * * * *